United States Patent
Curtis et al.

(10) Patent No.: US 9,124,515 B2
(45) Date of Patent: Sep. 1, 2015

(54) ELEPHANT FLOW DETECTION IN A COMPUTING DEVICE

(75) Inventors: Andrew Robert Curtis, Mountain View, CA (US); Praveen Yalagandula, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 12/951,748

(22) Filed: Nov. 22, 2010

(65) Prior Publication Data

US 2012/0131222 A1 May 24, 2012

(51) Int. Cl.
*H04L 12/28* (2006.01)
*H04L 12/851* (2013.01)
*H04L 12/54* (2013.01)
*H04L 12/721* (2013.01)

(52) U.S. Cl.
CPC .......... *H04L 47/2441* (2013.01); *H04L 12/569* (2013.01); *H04L 45/70* (2013.01)

(58) Field of Classification Search
CPC .......................... H04L 12/2634; H04L 12/569
USPC .......... 370/236, 235, 230, 232, 231; 709/225, 709/224, 223
See application file for complete search history.

(56) References Cited

U.S. PATENT DOCUMENTS

| | | | |
|---|---|---|---|
| 6,108,782 A * | 8/2000 | Fletcher et al. ............... | 713/153 |
| 2006/0050640 A1* | 3/2006 | Jin et al. .......................... | 370/235 |
| 2008/0005121 A1* | 1/2008 | Lam et al. ....................... | 707/10 |
| 2008/0232275 A1* | 9/2008 | Eswaran et al. ............... | 370/256 |
| 2009/0046581 A1* | 2/2009 | Eswaran et al. ............... | 370/230 |
| 2009/0116381 A1* | 5/2009 | Kanda ............................ | 370/229 |
| 2009/0193105 A1* | 7/2009 | Charny et al. ................. | 709/223 |
| 2009/0235170 A1* | 9/2009 | Golden et al. ................. | 715/719 |
| 2009/0268614 A1* | 10/2009 | Tay et al. ....................... | 370/236 |
| 2009/0285117 A1* | 11/2009 | Wang et al. .................... | 370/253 |
| 2009/0300209 A1* | 12/2009 | Elzur ............................. | 709/234 |
| 2009/0303882 A1* | 12/2009 | Tanaka et al. ................. | 370/237 |
| 2010/0027436 A1* | 2/2010 | Yamasaki ...................... | 370/252 |
| 2010/0082895 A1* | 4/2010 | Branscome et al. .......... | 711/108 |
| 2010/0157803 A1* | 6/2010 | Rivers et al. .................. | 370/235 |
| 2010/0226250 A1* | 9/2010 | Plamondon .................... | 370/230 |
| 2010/0232294 A1* | 9/2010 | Samuels et al. ............... | 370/235 |
| 2011/0069715 A1* | 3/2011 | Luo et al. ....................... | 370/401 |
| 2011/0085461 A1* | 4/2011 | Liu et al. ........................ | 370/252 |
| 2011/0113490 A1* | 5/2011 | Wang et al. .................... | 726/22 |
| 2011/0261688 A1* | 10/2011 | Sharma et al. ................. | 370/230 |
| 2011/0267954 A1* | 11/2011 | Seetharaman et al. ........ | 370/241 |
| 2012/0177051 A1* | 7/2012 | Yu .................................. | 370/392 |
| 2013/0003574 A1* | 1/2013 | Hayashi et al. ............... | 370/252 |

OTHER PUBLICATIONS

Jurga et al., Packet Sampling for Network Monitoring, Dec. 10, 2007.
Wang et al., c-Through: Part-Time Optics in Data Centers, SIGCOMM™ 10. Aug. 30-Sep. 3, 2010.

* cited by examiner

*Primary Examiner* — Ian N Moore
*Assistant Examiner* — Phong La
(74) *Attorney, Agent, or Firm* — Hewlett-Packard Patent Department

(57) ABSTRACT

Example embodiments relate to elephant flow detection in a computing device. In example embodiments, a computing device may monitor a socket for a given flow. The computing device may then determine whether the flow is an elephant flow based on the monitoring of the socket. If so, the computing device may signal the network that transmits the flow that the flow is an elephant flow.

14 Claims, 4 Drawing Sheets

ELEPHANT FLOW DETECTION IN A
COMPUTING DEVICE

BACKGROUND

Modern communication networks are capable of transferring a massive amount of data in a small period of time. For example, a typical datacenter may include hundreds or even thousands of servers, each capable of transmitting numerous gigabits of data per second. Although the capabilities of networks are ever increasing, so too is the amount of data transferred by applications that utilize these networks. Traffic management is therefore important in ensuring efficient utilization of the available network bandwidth.

BRIEF DESCRIPTION OF THE DRAWINGS

The following detailed description references the drawings, wherein.

DETAILED DESCRIPTION

Figure 1:
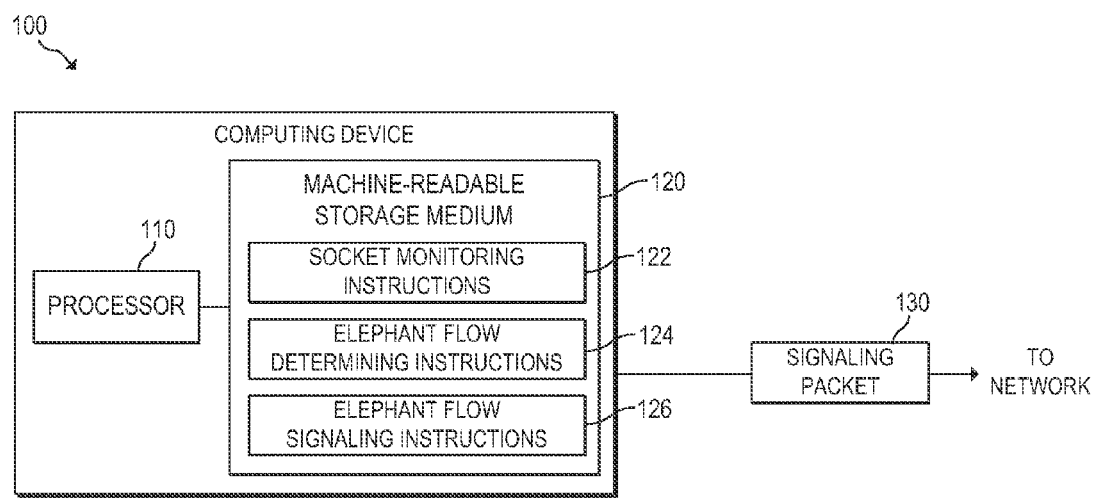
FIG. 1 is a block diagram of an example computing device for detection of elephant flows.

As detailed above, traffic management is important in ensuring that a network operates in an efficient manner by optimizing performance and minimizing congestion. For example, when a network includes multiple available paths for a given flow of data, an effective traffic management strategy ensures that the flow uses the most efficient path. In a typical network, a small percentage of flows consumes the large majority of bandwidth and therefore has the greatest impact on performance of the network. It is therefore a central problem of any traffic management strategy to identify and manage the flows that consume a large amount of bandwidth, sometimes known as "elephant flows." In particular, because elephant flows typically account for the majority of the data, proper management of these flows will have the greatest effect on the performance of the network.

Existing solutions for identifying elephant flows are deficient in a number of ways. For example, in some solutions, each application is responsible for marking flows that consume a significant amount of bandwidth. Although efficient, this approach can be problematic, as every application must be modified to support this behavior. Furthermore, this solution may be subject to abuse, as the application may be modified to mark flows in a manner inconsistent with the purpose of the traffic management strategy.

In other solutions, a switch in the network monitors each flow that passes through to gather statistics. The switch may then transfer these statistics to a central controller on a periodic basis to enable the controller to classify flows. This approach is not scalable to large networks for several reasons. First, the process of monitoring each flow at a given switch consumes a significant amount of resources, as it generally requires a Ternary Content-Addressable. Memory (TCAM) entry for each flow. In addition, transfers of statistics may consume a significant amount of bandwidth between each switch and the central controller, such that the transfer of statistics becomes the bottleneck in the network.

In yet another solution, a central controller samples a small percentage of packet headers from all ports of the switches in a network (e.g., 1 out of every 1,000 packets). In this approach, the central controller analyzes the sampled packet headers to classify flows. While this approach uses little bandwidth, it is also slow to detect elephant flows, sometimes requiring a flow to transfer upwards of 15 megabytes before it is detected as an elephant flow. Furthermore, this approach imposes a significant amount of overhead on the central controller, since the controller must process each sampled packet.

Thus, in summary, current solutions require modification of each application, require a large amount of bandwidth or switch processing, or are too slow to be effective. To address the problems with current solutions, example embodiments disclosed herein implement elephant flow detection by monitoring outgoing data provided to a socket in the computing device by an application in which the flow originates. For example, the computing device may monitor outgoing data provided to a socket by a User Datagram Protocol (UDP) flow or monitor outgoing data provided to a socket buffer used to queue packets belonging to a Transmission Control Protocol (TCP) flow. If the computing device determines that the flow is an elephant flow based on the monitoring, the computing device may then signal the network that transmits the flow that the flow is an elephant flow.

By identifying elephant flows based on examination of the data provided to a socket in the source computing device, example embodiments minimize or eliminate the need for modification of applications in the computing device. Furthermore, because the elephant flow determination may be performed at the source of the flow, rather than in the network, example embodiments minimize the overhead required for transmission of statistics and/or sampled packets. In this manner, example embodiments allow for faster identification of elephant flows with low overhead and minimal or no modification of applications. Additional embodiments and applications of such embodiments will be apparent to those of skill in the art upon reading and understanding the following description.

Referring now to the drawings, FIG. 1 is a block diagram of an example computing device 100 for detection of elephant flows. Computing device 100 may be, for example, a notebook computer, a desktop computer, a slate computing device, a wireless email device, a mobile phone, a server in a data center or other network, or any other computing device. In the embodiment of FIG. 1, computing device 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126 to implement the elephant flow detection procedure described in detail below. As an alternative or in addition to retrieving and executing instructions, processor 110 may include one or more integrated circuits (ICs) or other electronic circuits that include a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As described in detail below, machine-readable storage medium 120 may be encoded with a series of executable instructions 122, 124, 126 for detecting elephant flows based on sockets corresponding to flows that originate in computing device 100. In some embodiments, instructions 122, 124, 126 may be implemented in the operating system of computing device 100, thus minimizing the need to modify the applications of computing device 100.

Machine-readable storage medium 120 may include socket monitoring instructions 122, which may monitor data provided to a socket in computing device 100 by an application in which a particular data flow originates (e.g., the source endpoint of a flow). The socket may be a mechanism provided by the operating system for use by the application when transmitting outgoing data packets or other protocol data units. For example, the operating system may create a socket upon receipt of a request from an application or thread via an Application Programming Interface (API). The application may be any application that exchanges data with a remote device (e.g., a web server or browser, a Peer-to-Peer application, a File Transfer Protocol (FTP) server, a storage server, etc.). When the application has a data packet ready for transmission to the destination, the source application may provide the data packet to the socket and the operating system may then manage transmission of the data packet toward the destination.

Because the operating system manages the socket buffer, monitoring instructions 122 may be implemented as a shim layer in the operating system of computing device 100. The shim layer may be logic configured to examine data transmitted between two layers of the network protocol stack (e.g., between the transport and network layers), thereby leaving the structure of the existing network protocol stack intact. Thus, monitoring instructions 122 may have visibility of all data provided to each socket by each application. Monitoring instructions 122 may therefore observe the amount of data provided to a socket and, as detailed below, determining instructions 124 may analyze this data to identify elephant flows.

The mechanism used to monitor the socket may vary according to the protocol to be used for transmission of the data. For example, the operating system may provide a socket buffer for some protocols, such as the Transmission Control Protocol (TCP). The socket buffer may be a portion of memory in storage medium 120 or another storage medium accessible to computing device 100 that temporarily queues data belonging to a particular flow prior to transmission. Thus, the socket buffer may be, for example, a Transmission Control Protocol (TCP) buffer to temporarily store packets to be transmitted over a TCP connection from a source application in computing device 100 to a destination application in another computing device. In implementations in which the protocol uses a socket buffer, monitoring instructions 122 may monitor a fill level of the buffer, a total amount of data added to the buffer, or a rate at which data is added to the buffer.

On the other hand, the operating system of computing device 100 may not provide a buffer for some protocols. For example, the User Data Protocol (UDP) typically does not utilize a buffer in the operating system. In such implementations, monitoring instructions 122 may directly monitor the data provided to the socket via the API or other interface from the application to the operating system. For example, monitoring instructions 122 may monitor a total amount of data provided to the socket or a rate at which data is provided to the socket. It should be noted that, in some implementations, monitoring instructions 122 may directly monitor the data provided to the socket, rather than the buffer, even if the operating system provides a buffer for a particular protocol. Several example approaches for monitoring data provided to a socket are described below in connection with FIGS. 4A & 4B.

Machine-readable storage medium 120 may further include elephant flow determining instructions 124, which may determine, based on the amount of data provided to a particular socket by a particular application, whether the corresponding flow is an elephant flow. The determination of whether a given flow is an elephant flow may depend on the particular network. For example, in a high-bandwidth network, such as a data center, the size of a typical elephant flow is greater than in a lower-bandwidth network, such as a cellular network. The sizes of typical elephant flows will be apparent to those of skill in the art based on the particular network utilized by computing device 100.

As one example implementation of determining instructions 124, when monitoring instructions 122 provide information regarding the total amount of data or the rate at which data belonging to the flow is provided to the socket, instructions 124 may compare this amount or rate to a predetermined threshold. When the total amount of data or rate at which the source application is providing data to the socket exceeds the threshold, determining instructions 124 may determine that the corresponding flow is an elephant flow.

As another example, when monitoring instructions 122 provide information regarding the current fill level of a socket buffer corresponding to the socket, determining instructions 124 may compare the fill level to a predetermined threshold (e.g., 50% full, 75% full, completely full). When the current fill level reaches the predetermined threshold fill level, determining instructions 124 may determine that the corresponding flow is an elephant flow.

Finally, machine-readable storage medium 120 may include elephant flow signaling instructions 126, which may signal a network used for transmission of the particular flow when it is determined that the particular flow is in fact an elephant flow. For example, signaling instructions 126 may utilize an in-band signaling mechanism to notify one or more switches, routers, controllers, or other network nodes that the flow is an elephant flow.

The particular signaling mechanism utilized for notifying the network of an elephant flow may vary by embodiment. In some embodiments, signaling instructions 126 may utilize a portion of the header of a packet belonging to the flow. For example, signaling instructions 126 may add a predetermined pattern of bits to the Differentiated Services Code Point (DSCP) field, a Virtual Local Area Network (VLAN) Priority Code Point (PCP), or another field of the Internet Protocol (IP) header of a packet belonging to the flow. As a specific example, signaling instructions 126 may set the DSCP field to "000011," as the code point space corresponding to "xxxx11" is generally reserved for experimental or local usage. In other embodiments, signaling instructions 126 may utilize one or more packets to transmit a separate elephant flow notification message into the network, provided that these packets include information sufficient to uniquely identify the flow.

In response to receipt of a notification of an elephant flow, the network may utilize the signal to, for example, assign the flow to the best available path in the network. Additional details regarding the use of the elephant flow signal to reconfigure the network are provided below in connection with network nodes 225, 230, 240 of FIG. 2.

Figure 2:
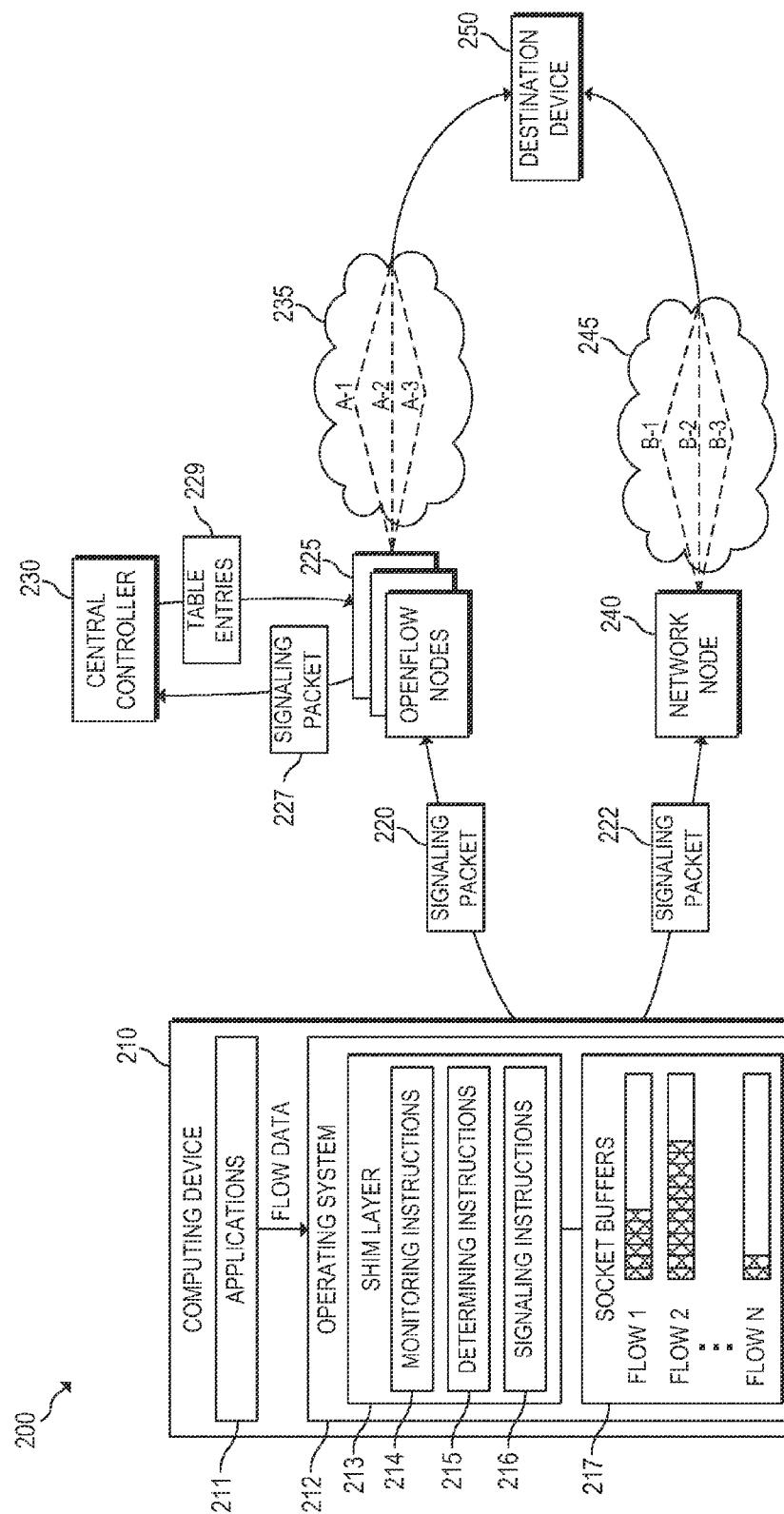
FIG. 2 is a block diagram of an example system for detection of elephant flows based on monitoring of a socket buffer by a shim layer included in an operating system of a computing device.

FIG. 2 is a block diagram of an example system 200 for detection of elephant flows based on monitoring of a socket buffer 217 by a shim layer 213 included in an operating system 212 of a computing device 210. As detailed below, system 200 may include a computing device 210 that transmits data to a destination device 250 via network nodes 225, 240 and networks 235, 245.

As with computing device 100 of FIG. 1, computing device 210 may be a notebook computer, a desktop computer, a slate computing device, a wireless email device, a mobile phone, a server, or any other computing device. Computing device 210 may include a processor (not shown), such as a processor 110 described above in connection with FIG. 1. Computing device 210 may also include a machine-readable storage medium encoded with executable instructions. For example, operating system 212 and instructions 214, 215, 216 included in shim layer 213 may be encoded on the machine-readable storage medium and executed by the processor.

Operating system 212 may include a series of executable instructions for managing the hardware of computing device 210. Furthermore, operating system 212 may provide an interface to applications executing on computing device 210 (e.g., an API), such that the applications may access the hardware. For example, operating system 212 may provide one or more sockets to each application for transmission of data packets from computing device 210 to a destination device 250. After an application provides data packets to the sockets, the operating system may then manage transmission of the data using a corresponding hardware interface, such as a network interface card. In some embodiments, operating system 212 may provide a socket buffer 217 for each flow to temporarily queue data packets prior to transmission via the appropriate interface.

Because operating system 212 has a view of the data packets transmitted by each application via the sockets, a shim layer 213 may be included in operating system 212 to inspect the data provided to the sockets or corresponding socket buffers 217. For example, shim layer 213 may include logic for examining data transmitted between two layers of the network stack to identify elephant flows. Thus, shim layer 213 may include monitoring instructions 214, determining instructions 215, and signaling instructions 216, each described in turn below.

Monitoring instructions 214 may monitor outgoing data provided from an application to a socket provided by operating system 212. This outgoing data may be associated with a particular flow originating in the application. For example, the flow may include data transmitted by a server (e.g., a web server or storage server), a peer-to-peer file sharing program, a web browser, or any other application that transmits data belonging to a flow to a destination device 250.

In operation, monitoring instructions 214 may monitor the data provided to a socket and, in some cases, to a socket buffer 217 corresponding to a flow. For example, monitoring instructions 214 may monitor an amount of data provided by an application to the socket or socket buffer 217 over a predetermined period of time. Alternatively, monitoring instructions 214 may track a total amount of data provided to the socket or socket buffer 217 since the socket was opened by the application for the particular flow. As another alternative, monitoring instructions 214 may monitor the fill level of a socket buffer 217 with respect to the total capacity of the buffer 217.

Determining instructions 215 may determine, based on the monitoring performed by instructions 214, whether the particular flow is an elephant flow. For example, determining instructions 215 may determine that a flow is an elephant flow when the total amount of data provided to the socket during a predetermined period of time exceeds a given threshold value. The threshold may be, for example, a total number of bytes or a rate at which the data was transmitted during the period in, for example, bytes per second. Similarly, determining instructions 215 may determine that a flow is an elephant flow when the total amount of data transmitted since the socket was opened exceeds a given threshold value. As another example, determining instructions 215 may determine that the flow is an elephant flow when the fill level of the socket buffer 217 corresponding to the particular flow meets or exceeds a given level (e.g., 75% or more full).

It should be noted that the thresholds used by determining instructions may vary depending on the application, the network used for transmission of the flow, and other factors. For example, when the network is a high-bandwidth network, such as those used in a data center, the threshold for the amount of data or the transfer rate may be higher than when the network is a cellular or wireless network. Suitable data amounts and transfer rates will be apparent to those of skill in the art.

Based on the determination made by instructions 215, signaling instructions 216 may generate and transmit a signal 220, 222 into the network used for transmission of the particular flow. This signal 220, 222 may notify the network that the flow is an elephant, such that the network may properly route the flow. As with signaling instructions 126 of FIG. 1, signaling instructions 216 may utilize a portion of the header of a packet belonging to the flow or may instead use a dedicated signaling packet.

The type of signaling packet and the corresponding response in the network may vary based on the type of network. For example, in networks operating according to the OpenFlow specification, a central controller 230 is responsible for managing the routing tables stored on each OpenFlow node 225. In particular, upon receipt of a packet, if an OpenFlow node 225 does not have an entry in the routing table matching the packet, the node 225 forwards the packet to the central controller 230, which responds with a routing table entry. OpenFlow nodes 225 may also contain table entries specifying particular packets to be forwarded to the central controller 230, such as packets with a particular pattern in the header.

Signaling instructions 216 may utilize the OpenFlow architecture to ensure that elephant flows are properly routed. When the network is initialized, central controller 230 may instruct all nodes 225 to forward all packets containing a particular pattern in the header (e.g., a DSCP value of "000011") to central controller 230. Subsequently, when computing device 210 detects an elephant flow, signaling instructions 216 may set the header of a packet to the pattern and transmit the signaling packet 220 to an appropriate OpenFlow node 225.

Upon receipt of the signaling packet 220 identifying an elephant flow, the OpenFlow node 225 may forward the packet 227 to central controller 230, which will respond to one or more nodes 225 with table entries 229 specifying how the elephant flow is to be routed through network 235. For example, controller 230 may compute the best available path through network 235 and the table entries 229 may define this path. Each node 225 may then install these table entries 229 into its routing table. As a result, upon receipt of subsequent packets in the flow, the OpenFlow node 225 may forward the packet to destination device 250 via the next node in the path computed by the central controller 230 (e.g., Path A-1, A-2, or A-3).

In some embodiments, central controller 230 may implement a mechanism to control the number of packets forwarded by the nodes 225 based on its processing load. For example, setting the elephant flow threshold in computing device 210 to a value that is too low may result in controller 230 being inundated with signaling packets 227. Accordingly, when controller 230 is receiving too many signaling packets 227, controller 230 may transmit a signal to each computing device 210, instructing the computing device 210 to raise its threshold. As an alternative, multiple packet header values may correspond to different levels of thresholds. For example, when using DSCP values, a value of xxxx11 may denote a flow that has more than 100 kilobytes (KB) of data, a value of xxx111 may denote more than 1 megabyte (MB) of data, a value of xx1111 may denote more than 10 MBs of data, etc. In such embodiments, central controller 230 may dynamically regulate the number of signaling packets 227 it receives based on its load by modifying the table entries in each node 225 to correspond to a particular threshold value.

In other networks, a network node 240 may select a path for a flow based on a priority or bandwidth-requirements of the flow. For example, network node 240 may associate a predetermined Quality of Service (QoS) with each of a number of paths, B-1, B-2, B-3, in network 245 and may utilize these paths according to the requirements of each flow. Accordingly, in some implementations, signaling instructions 216 may generate and transmit a signaling packet 222 indicating that the flow is an elephant and, in response, network node 240 may select the best-available path for transmission of the elephant flow. Upon receipt of subsequent packets belonging to the elephant flow, network node 240 may then transmit the packets to destination device 250 via the identified path.

Figure 3:
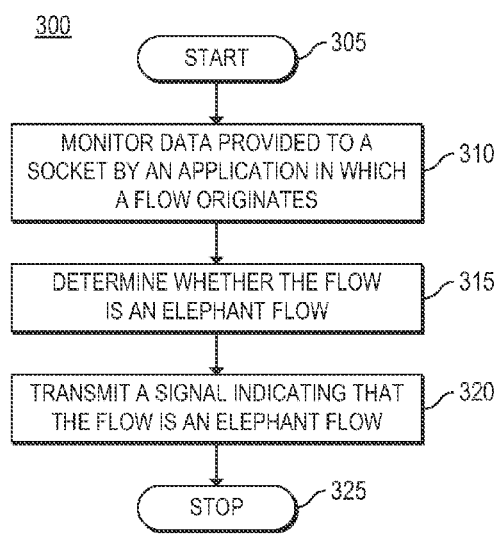
FIG. 3 is a block diagram of an example method for detection of elephant flows.

FIG. 3 is a block diagram of an example method 300 for detection of elephant flows. Although execution of method 300 is described below with reference to computing device 100, other suitable components for execution of method 300 will be apparent to those of skill in the art (e.g., computing device 210). Method 300 may be implemented in the form of executable instructions stored on a machine-readable storage medium, such as storage medium 120, and/or in the form of electronic circuitry.

Method 300 may start in block 305 and proceed to block 310, where computing device 100 may monitor data provided to a socket by an application in which a particular flow originates. For example, a shim layer included in the operating system of computing device 100 may monitor an amount of data provided from the application to the socket. The amount of data may be, for example, a total amount of data provided since the application opened the socket, an amount or rate of data provided to the socket during a predetermined period of time, or a fill level of a socket buffer corresponding to the socket. Additional details regarding two example methods for monitoring a socket are provided below in connection with FIGS. 4A & 4B.

In block 315, computing device 100 may determine whether the flow is an elephant flow based on the amount of data provided to the operating system. For example, computing device 100 may determine that the flow is an elephant flow when the amount of data provided to the socket exceeds a predetermined threshold.

When computing device 100 determines in block 315 that the flow is an elephant flow, method 300 may proceed to block 320, where computing device 100 may transmit a signal indicating that the particular flow is an elephant flow. For example, computing device 100 may set one or more fields in the header of a packet belonging to the flow to a predetermined pattern. Alternatively, computing device 100 may generate and transmit a dedicated signaling packet into the network. After appropriately notifying the network of the presence of an elephant flow, method 300 may proceed to block 325, where method 300 may stop. It should be noted that method 300 may be repeated multiple times for a given flow while the socket remains open, since a flow may switch between being an elephant and a non-elephant flow while the flow is transmitting data.

Figure 4A:
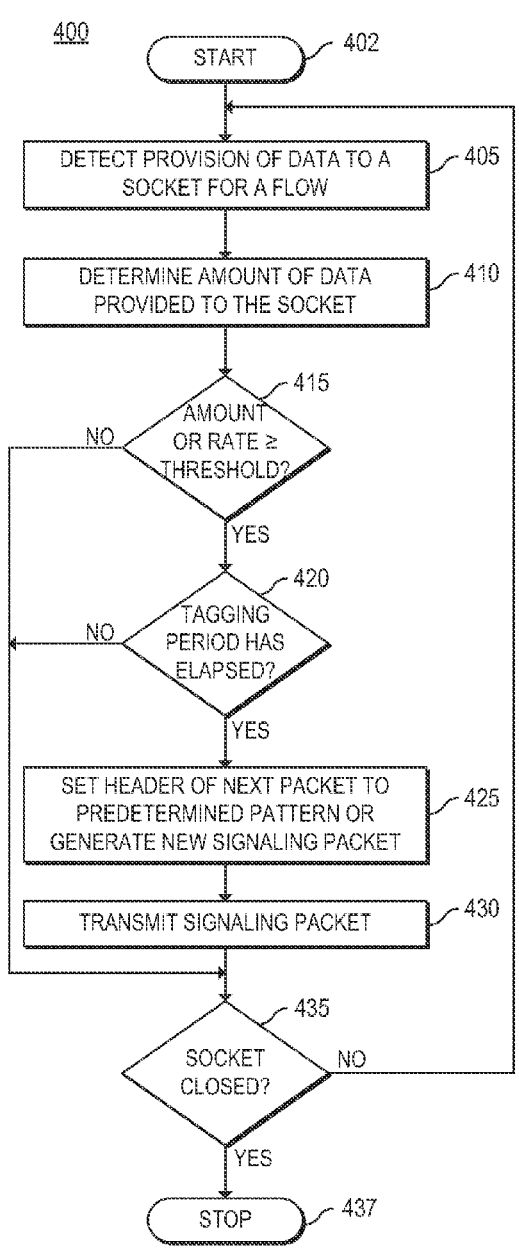
FIG. 4A is a block diagram of an example method for detection of elephant flows based on monitoring of an amount or rate of data provided to a socket.
Figure 4B:
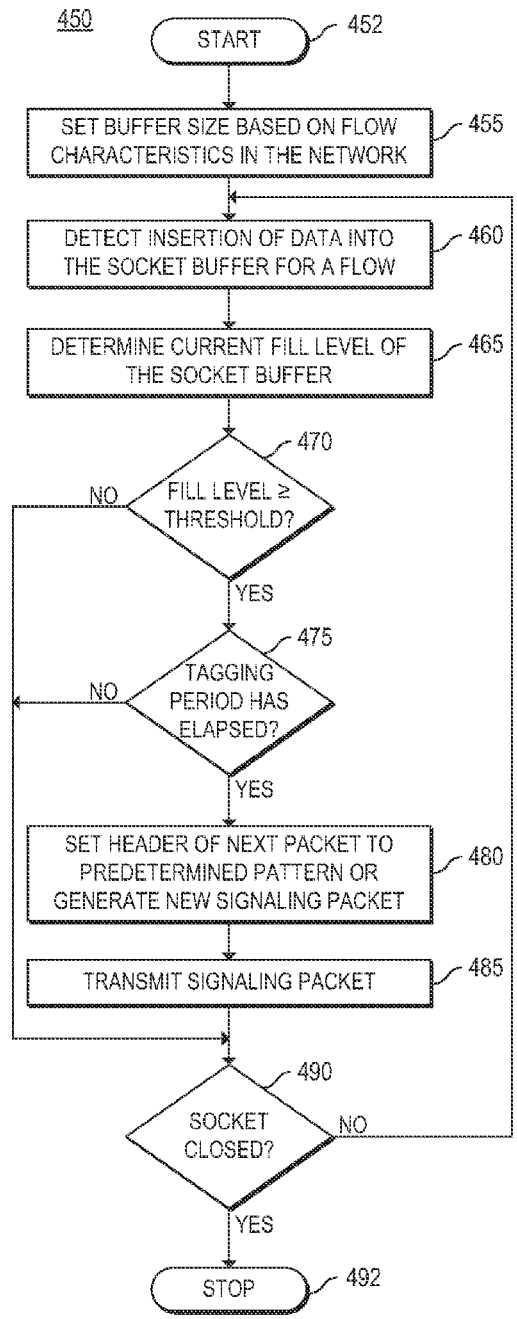
FIG. 4B is a block diagram of an example method for detection of elephant flows based on monitoring of a fill level of a socket buffer.

FIGS. 4A & 4B, each described below, are methods 400, 450 that detect an elephant flow based on data provided from an application to a socket or socket buffer. Although methods 400, 450 are described below with reference to computing device 210, other suitable components for execution of methods 400, 450 will be apparent to those of skill in the art. Methods 400, 450 may be implemented in the form of executable instructions stored on a machine-readable storage medium and/or in the form of electronic circuitry.

FIG. 4A is a block diagram of an example method 400 for detection of elephant flows based on monitoring of an amount or rate of data provided to a socket. Method 400 may start in block 402 and proceed to block 405, where computing device 210 may detect provision of data to a socket opened by an application in which a particular flow originates. For example, a shim layer 213 included in an operating system 212 of computing device 210 may detect the provision of data from the application to the socket. As detailed above, in some implementations, computing device 210 may monitor a socket buffer used to queue data provided to the socket by the application.

Upon detection of the provision of data to the socket, method 400 may then proceed to block 410, where computing device 210 may determine the amount of data provided to the socket as, for example, a number of bytes. Computing device 210 may then add the determined number of bytes to a running total, which may track a total amount of data provided to the socket since it was opened. Alternatively, the total may track a total amount of data provided to the socket in a given period of time. In such implementations, computing device 210 may determine a rate at which data is provided to the socket by dividing the total amount of data for the time period by the duration of the time period.

After computing device 210 determines the total amount of data or a corresponding rate, method 400 may proceed to block 415, where computing device 210 may determine whether the amount of data or the determined rate is greater than or equal to a threshold level. The threshold level may vary based, for example, on the characteristics of the network used for transmission of the flow, such that the threshold is higher in networks with a greater amount of bandwidth.

When computing device 210 determines that the amount of data or the rate is greater than or equal to the threshold, method 400 may proceed to block 420. In block 420, computing device 210 may determine whether a minimal amount of time has elapsed since the elephant flow was last tagged. In other words, to ensure that a central controller 230 or other node 240 is not overly burdened with elephant flow signals, computing device 210 may only send out a signal once every t seconds, where t may vary by implementation.

When computing device 210 determines that the tagging period has elapsed, method 400 may continue to block 425, where computing device 210 may generate the signaling packet. For example, computing device 210 may either set the header of the next packet to a predetermined pattern or generate a dedicated signaling packet. In block 430, computing device 210 may transmit the signaling packet to the next hop in the network, which may be, for example, an OpenFlow node 225 or another network node 240.

Method 400 may then proceed to block 435. Alternatively, if computing device 210 determines in block 415 that the amount or rate is less than the threshold or determines in block 420 that the tagging period has not elapsed, method 400 may skip directly to block 435. In block 435, computing device 210 may determine whether the socket corresponding to the particular flow has been closed. If not, method 400 may return to block 405, where computing device 210 may continue monitoring the socket for provision of data. Otherwise, method 400 may proceed to block 437, where method 400 may stop.

FIG. 4B is a block diagram of an example method 450 for detection of elephant flows based on monitoring of a fill level of a socket buffer. Method 450 may start in block 452 and proceed to block 455, where computing device 210 may configure the size of the socket buffer based on flow characteristics of the target network. For example, in a high-bandwidth network, such as a data center, a typical flow is relatively large, so computing device 210 may set the buffer to a large size (e.g., 1 megabyte). In contrast, in a lower-bandwidth network, such as a cellular or wireless network, where typical flows are much smaller, computing device 210 may set the buffer to a smaller size (e.g., 64 kilobytes).

Method 450 may then proceed to block 460, where computing device 210 may detect insertion of data into the socket buffer corresponding to a flow. For example, a shim layer 213 in the operating system 212 of computing device 210 may detect insertion of data into the socket buffer by the application in which the flow originates.

After detection of the insertion of data into the socket buffer, method 450 may proceed to block 465, where computing device 210 may determine the current fill level of the buffer. For example, computing device 210 may determine the total number of bytes of data queued in the buffer or, alternatively, may determine the percentage of the buffer that is occupied.

In block 470, computing device 210 may determine whether the fill level of the socket buffer has reached a threshold level. The threshold may be, for example, a percentage (e.g., 75% full) or an amount of data (e.g., 64 kilobytes, 1 megabyte, etc.). If the socket buffer has reached the fill level, method 450 may continue to block 475, where, as with block 420 of FIG. 4A, computing device 210 may determine whether a tagging period has elapsed. If so, method 450 may proceed to blocks 480 and 485, where computing device 210 may generate and transmit a signaling packet, as described above in connection with blocks 425 and 430 of FIG. 4A.

Method 450 may then proceed to block 490. Alternatively, if computing device 210 determines in block 470 that the fill level is lower than the threshold or determines in block 475 that the tagging period has not elapsed, method 450 may skip directly to block 490. In block 490, computing device 210 may determine whether the socket corresponding to the particular flow has been closed. If not, method 450 may return to block 460, where computing device 210 may continue monitoring the socket buffer for insertion of data. Otherwise, method 450 may proceed to block 492, where method 400 may stop.

Figure 5:
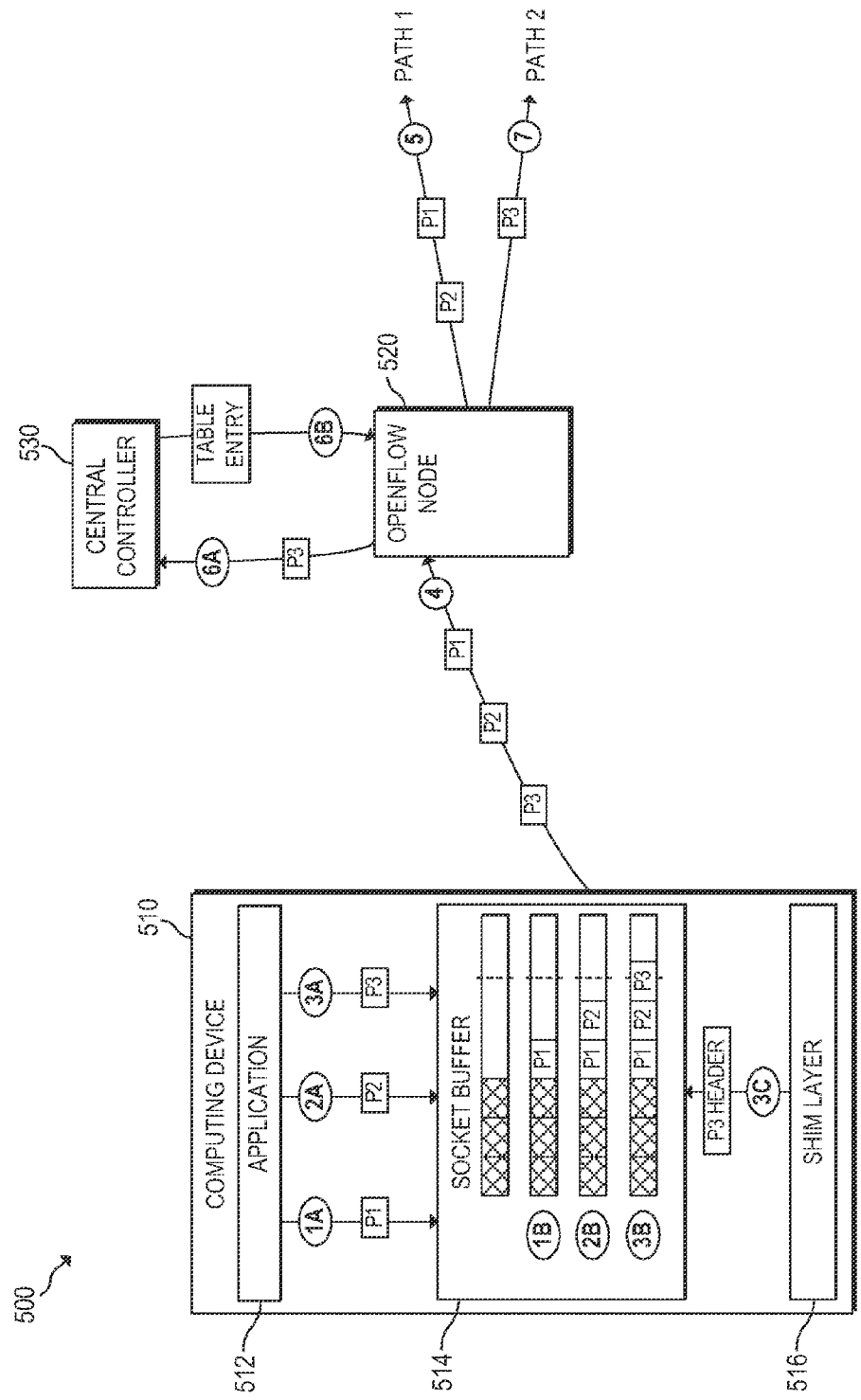
FIG. 5 is a block diagram of an example operation flow illustrating the processing of example packets by a computing device.

FIG. 5 is a block diagram of an example operation flow 500 illustrating the processing of example packets by a computing device 510. As illustrated, computing device 510 includes an application 512 that provides data to a socket buffer 514 that temporarily stores data for a particular flow. A shim layer 516 included in the operating system of computing device 510 monitors the fill level of socket buffer 514 to determine whether the flow associated with application 512 is an elephant flow.

It should be noted that, although operation flow 500 is described below with reference to a shim layer 516 that monitors the fill level of a socket buffer 514, operation flow 500 is equally applicable to implementations in which a buffer is not utilized (e.g., when device 510 transmits a UDP flow). Furthermore, although described in connection with a network that complies with the OpenFlow specification, operation flow 500 is applicable to any network.

Referring now to block 1A of operation flow 500, application 512 initially generates a first data packet, P1, and provides the packet to socket buffer 514 using, for example, an API provided by the operating system of computing device 510. As shown by block 1B, packet P1 is inserted into the socket buffer. Shim layer 516 detects this insertion, but takes no action, as the fill level of socket buffer 514 has not reached the predetermined threshold (illustrated by the dotted line). In block 2A, application 512 generates a second data packet, P2, and inserts the packet into buffer 514, as shown by block 2B. Again, shim layer 516 detects this insertion, but takes no action.

Next, in block 3A, application 512 generates a third data packet, P3, and inserts P3 into buffer 514. As illustrated by block 3B, the fill level of buffer 514 has now exceeded the threshold. Accordingly, shim layer 516 detects this condition and, in block 3C, generates a header for P3 that includes a marking indicating that the flow is an elephant flow.

In block 4, computing device 510 begins emptying socket buffer 514 and, in the process, transmits packets P1, P2, and P3 to the next hop, OpenFlow node 520. Upon receipt of the unmarked packets, P1 and P2, node 520 forwards the packets along path 1, as illustrated by block 5.

Upon receipt of P3, however, node 520 detects the modified header with the elephant flow marking and therefore forwards P3 to central controller 530, as shown by block 6A. In response, central controller 530 determines the most efficient path for the flow (here, Path 2) and, as shown by block 6B, transmits a forwarding table entry to node 520. In response, node 520 updates its forwarding table and, as shown by block 7, begins transmitting packets belonging to the elephant flow over Path 2, starting with packet P3.

According to the foregoing, example embodiments disclosed herein allow for fast detection of elephant flows in a manner that minimizes bandwidth usage in the network. Furthermore, because the flow detection process may be implemented in the operating system of the source of a flow, example embodiments minimize or eliminate the need to modify individual applications. Additional advantages of embodiments disclosed herein will be apparent based on the foregoing description.

We claim:

1. A source computing device for detection of elephant flows, the source computing device comprising:
   a non-transitory machine-readable storage medium; and
   a processor in communication with the non-transitory machine-readable storage medium to:
   monitor outgoing data associated with a particular flow that originates from an application to a socket provided by an operating system (OS) of the source computing device, the outgoing data associated with a particular flow originating in the application wherein to monitor the outgoing data, the processor is to monitor a current fill level of a socket buffer corresponding to the socket,
   determine at the source computing device, based on the monitoring of the outgoing data provided to the socket, whether the particular flow is an elephant flow, wherein the particular flow is an elephant flow when the current fill level of the socket buffer reaches a given level, and send a signal indicating that the particular flow is an elephant flow into a network that transmits the particular flow, the signal indicating that the particular flow is an elephant flow, wherein to send the signal, the processor is to set at least one bit in a header of a packet of the particular flow to indicate that the particular flow is an elephant flow.

2. The source computing device of claim 1, wherein, to monitor, determine, and send, the processor executes logic included in a shim layer of the OS of the source computing device.

3. The source computing device of claim 1, wherein:
the processor monitors an amount of data provided to the socket during a given period of time,
the processor determines a rate at which the data was provided to the socket based on the amount of data and a duration of the given period of time, and
the processor determines that the particular flow is an elephant flow when the determined rate exceeds a given value.

4. The source computing device of claim 1, wherein:
the processor monitors a total amount of data provided to the socket since the socket was opened for the particular flow, and
the processor determines that the particular flow is an elephant flow when the total amount of data provided to the socket exceeds a given value.

5. The source computing device of claim 1, wherein the processor is further to size the socket buffer based on characteristics of a plurality of flows in the network used for transmission of the particular flow.

6. The source computing device of claim 1, wherein the signal sent by the processor comprises
a separate signaling packet indicating that the particular flow is an elephant flow.

7. The source computing device of claim 1, wherein:
in sending the signal into the network, the processor tags a signaling packet for transmission to a central controller in the network.

8. A non-transitory machine-readable storage medium encoded with instructions executable by a processor of a source computing device for detection of elephant flows, the machine-readable storage medium comprising:
instructions for monitoring data provided from an application in which a particular flow originates to a socket provided in an operating system hosting the application in the source computing device, wherein the instruction for monitoring the outgoing data include monitoring a current fill level of a socket buffer corresponding to the socket;
instructions for determining at the source computing device, based on an amount of data provided to the socket by the application determined from the monitoring, whether the particular flow is an elephant flow, wherein the particular flow is an elephant flow when the current fill level of the socket buffer reaches a given level; and
instructions for signaling a network used for transmission of the particular flow when it is determined that the particular flow is an elephant flow, wherein the instruction for signaling the network include setting at least one bit in a header of a packet of the particular flow to indicate that the particular flow is an elephant flow.

9. The non-transitory machine-readable storage medium of claim 8, wherein the instructions for monitoring, the instructions for determining, and the instructions for signaling are included in instructions of an operating system (OS) of the source computing device.

10. The non-transitory machine-readable storage medium of claim 9, wherein the instructions for monitoring monitor a socket buffer provided by the OS of the source computing device to queue the data provided to the socket by the application.

11. The non-transitory machine-readable storage medium of claim 8, wherein the instructions for monitoring comprise one of:
instructions for monitoring a rate at which data is provided to the socket, and
instructions for monitoring a total amount of data provided to the socket.

12. A method for detection of elephant flows in a source computing device, the method comprising:
monitoring, by a shim layer included in an operating system (OS) of the source computing device, an amount of data provided from an application in which a particular flow originates to a socket in the operating system, wherein the monitoring of the amount of data includes monitoring a current fill level of a socket buffer corresponding to the socket;
determining at the source computing device that the particular flow is an elephant flow when current fill level of the socket buffer reaches a given level; and
transmitting a signal indicating that the particular flow is an elephant flow when it is determined that the particular flow is an elephant flow, wherein transmitting the signal includes setting at least one bit in a header of a packet of the particular flow to indicate that the particular flow is an elephant flow.

13. The method of claim 12, wherein the monitoring comprises one of:
monitoring the amount of data as a rate at which data is added to a socket buffer provided by the operating system; and
monitoring the amount of data as a total amount of data added to the socket buffer since the particular originated.

14. The method of claim 13, wherein the socket buffer is a Transmission Control Protocol (TCP) buffer provided by the operating system for transmission of the particular flow.

* * * * *